Figure 1:
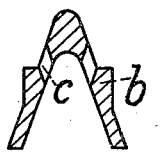

O. GUTTMANN.
FILLING MATERIAL FOR REACTION SPACES.
APPLICATION FILED JUNE 3, 1907.

912,310. Patented Feb. 16, 1909.

Witnesses.
Jesse N. Lutton
R. W. Sommers

Inventor.
Oscar Guttmann
by Henry Orth Jr.
Atty.

UNITED STATES PATENT OFFICE.

OSCAR GUTTMANN, OF LONDON, ENGLAND.

FILLING MATERIAL FOR REACTION-SPACES.

No. 912,310.  Specification of Letters Patent.  Patented Feb. 16, 1909.

Application filed June 3, 1907. Serial No. 377,124.

*To all whom it may concern:*

Be it known that I, OSCAR GUTTMANN, a subject of the King of Great Britain, residing at London, England, have invented a new and useful Filling Material for Reaction - Spaces, of which the following is a specification.

My invention relates to that class of apparatus used for mixing, attemperating, condensing, or effecting chemical reactions between liquids or gases in which the said liquids or gases are caused to pass through such spaces and over such surfaces as will or are intended to divide or break up the flow thereof and by contact with the said surfaces effect the desired exchanges, reactions, or interreactions. The spaces and surfaces abovementioned are obtained by the use, in the interior of apparatus of the kind, of bodies or units so disposed towards each other as to afford such spaces for the flow of the liquids or gases there through as will enable such liquids or gases to be brought as far as possible into intimate contact with the operative surfaces without retarding the flow and so as to secure the maximum effective surface. But the bodies or units hitherto employed while being ponderous are more or less ineffective because they leave channels between each other which permit the liquids or gases to pass by with a small amount of contact, or even if effective are very costly or in other well known respects unsuitable. Even the improved bodies or units in the form of hollow balls which are described in my German Patent Specification No. 91815 of 1896 are too expensive when used in large apparatus such as a Guy Lussac tower or a water cooling tower and moreover they are liable to become filled or coated with solid matter suspended or produced in liquids or gases that may be operated on. My improved contact bodies or units on the other hand are very light, simple to make and use, inexpensive in construction, and they cannot become filled with deposit while at the same time they present a greater area of contact surface and capacity of reaction space in each cubic foot of apparatus than other forms of bodies or units hitherto used, with the exception of the hollow balls abovementioned. They can also be made so as to have more free gas passage to each square foot of contact surface than any other bodies or units used as filling material for the said kind of apparatus and so as not to permit the gases or liquids treated therein to follow a direct outlet instead of passing from body to body. In all such respects my improved bodies are superior to those hitherto employed.

My improved bodies or units which are made of suitable material and of suitable size are channel like structures ∧ or ∩ shaped in cross section and are provided with shoulders on their outer surface upon which another row of channels can be placed. Perforations or slots are formed near the shoulders through the walls of the channels for the passage of the gases or liquids so that when two or more units are superimposed the one upon the other and so on, the whole forms a honeycombed or cellular structure having intercommunicating reaction spaces formed between the successive layers of superposed units. Instead of making the channels single of a ∧ or ∩ shaped cross section with shoulders they may be made of a W shaped cross section or double channel form in a manner easily understood and any of the said channels may also be used in a reversed position and instead of being made continuous channels from one to the other they may be divided in their length into compartments by inserting division walls at suitable intervals apart and the inner and outer surfaces may be fluted or corrugated so as to increase the area of the contact surfaces.

Figure 2:
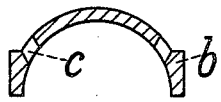
Figure 3:
Figure 4:
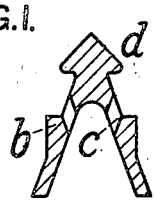
Figure 5:
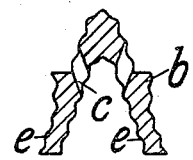
Figure 6:
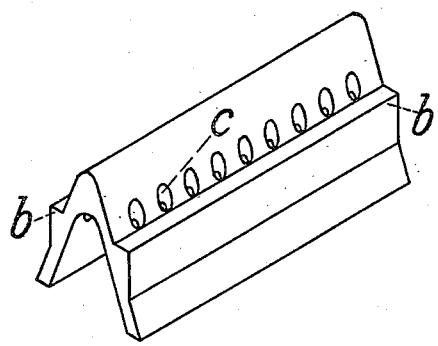
Figure 7:
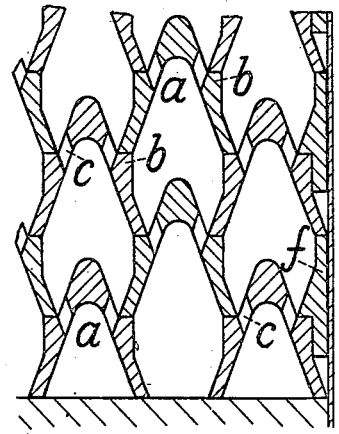
Figure 8:
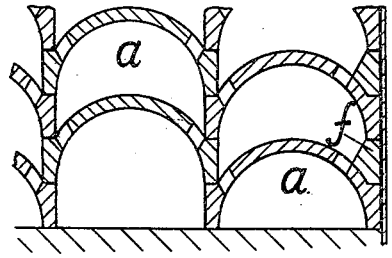
Figure 9:
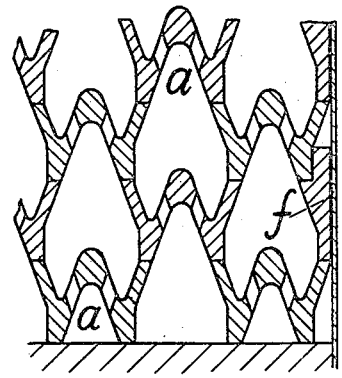

In the accompanying drawing Figure 1 is a cross sectional view of such an ∧ shaped channel part referred to. Fig. 2 a similar view of a semicircular channel. Fig. 3 a W shaped channel. Figs. 4 and 5 modifications of Fig. 1. Fig. 6 a perspective view of an ∧ shaped channel part and Figs. 7, 8, 9, show channels of various shapes as placed in position in a tower like form of the apparatus beforementioned.

In these drawings $a$ are the channels, $b$ the shoulders, $c$ the holes for the passage of gases and liquid, $d$ is an extension of the apex of a channel part for the purpose of further deflecting the current of gas, if so desired. In Fig. 5 the sides of the channel part are shown corrugated.

Where the units touch the sides or containing walls of an apparatus wherein they are placed or disposed, a vertical side strip $f$ is interposed and serves as a support for the row of units superposed as above described and at the same time prevents the gases or liquid from leaking past without passing through and over the surfaces of the units.

What I claim as my invention and desire to secure by Letters Patent is:—

1. Filling material for reaction spaces, composed of a plurality of channel shaped bodies provided with apertures and having external shoulders for the support of adjacent bodies, and bodies superimposed on the shoulders of said adjacent bodies.

2. Filling material for reaction spaces composed of a plurality of inverted channel shaped bodies provided with apertures and external shoulders formed at the apertures, the arms of one body resting on the shoulders of two adjacent bodies.

3. Filling material for reaction spaces composed of a plurality of inverted channel shaped bodies having diverging sides provided with apertures, and projections on said sides below said apertures, one arm of an adjacent body supported on one of said projections and a supporting medium mounted on the other projection.

4. Filling material for reaction spaces composed of a plurality of inverted channel shaped bodies having their sides diverging from the top and provided with oblique passages therein, and projections on said sides below the outer edges of the passage.

In witness whereof I have hereunto set my hand in presence of two witnesses.

OSCAR GUTTMANN.

Witnesses:
H. D. JAMESON,
F. L. RAND.